United States Patent [19]
Herrmann et al.

[11] Patent Number: 5,307,902
[45] Date of Patent: May 3, 1994

[54] GAS METER COUNTER UNIT WITH IMPROVED SHAFT LUBRICATION

[75] Inventors: Richard T. Herrmann, Pinehurst; Albert B. Atkinson, Houston, both of Tex.

[73] Assignee: Dresser Industries, Inc., Dallas, Tex.

[21] Appl. No.: 36,601

[22] Filed: Mar. 24, 1993

[51] Int. Cl.$^5$ ............................................. F16N 7/12
[52] U.S. Cl. ........................................ 184/64; 184/102; 184/109; 384/902; 384/279; 73/198
[58] Field of Search ............... 184/5, 6.19, 64, 100, 184/6.12, 102; 384/279, 902; 73/198

[56] References Cited

U.S. PATENT DOCUMENTS

| | | | |
|---|---|---|---|
| 2,042,635 | 6/1936 | Schellens | 384/902 |
| 2,182,414 | 12/1939 | Tarbell | |
| 2,613,119 | 10/1952 | Seemann | |
| 3,118,272 | 1/1964 | Clapp | |
| 3,367,445 | 2/1968 | Dryden | 184/6 A |
| 3,451,733 | 6/1969 | Scott, Jr. et al. | |
| 3,563,615 | 2/1971 | Dobelin | |
| 3,580,106 | 5/1971 | Wiehl et al. | |
| 3,698,514 | 10/1972 | Buck et al. | 184/6.4 |
| 3,785,461 | 1/1974 | Rompa | 184/64 |
| 3,969,939 | 7/1976 | Grzeslo | |
| 4,253,333 | 3/1981 | Schneider | 73/253 |
| 4,820,140 | 4/1989 | Bishop | 384/279 |
| 4,853,813 | 8/1989 | Yamanouchi | |
| 5,031,526 | 7/1991 | Helinski et al. | |
| 5,105,911 | 4/1992 | Atkinson | |

Primary Examiner—Thomas E. Denion

[57] ABSTRACT

In a meter counter assembly of a gas meter, a rotatable shaft of a gear train is journaled in a bore that extends through a support plate mounted in the housing of the counter. The plate is of a porus material, forming capillary passages for the transmission of lubricant therethroughout. A portion of the support plate extends into a lubricant reservoir in the housing. In use, lubricant migrates through the capillary passages to the bore from the reservoir for lubrication of the shaft.

3 Claims, 2 Drawing Sheets

GAS METER COUNTER UNIT WITH IMPROVED SHAFT LUBRICATION

BACKGROUND OF THE INVENTION

1. Technical Field

This invention relates to a lubrication system used in a rotary positive displacement gas meter for lubrication of rotatable shafts of a gear train incorporated in a gas volume counter unit of the meter.

2. Background Information

Important to the length of the service life of a gas meter is adequate lubrication of the gear train and bearing assemblies utilized in the counter unit of the meter. In prior positive displacement gas meters, different mechanisms have been used to provide lubrication to the bearing assemblies of the counter units.

For example, in one prior arrangement, bearing sleeves for the rotating shaft of the gear train are mounted in support plates which in turn are secured within the housing of the counter unit. One of a normally spaced pair of such support plates is shown in the drawing figure identified as prior art. In the disclosed prior art plate, a time consuming and expensive manufacturing process is involved in assembling the sleeves with the plate. The sleeves are preset within bores formed through the support plates and problems with the process may be enccuntered in securing the sleeves in the support. Deformation of the bearing sleeves often occurs requiring the bearing inside diameters to be resized in a reaming procedure. This also often results in the bearings between pairs of the support plates being slightly out of true alignment. This in turn may cause premature wear of the bearings and unnecessary drag on the shaft which is mounted in the bearings.

In providing lubrication to prior art bearings, lubricating oil is transferred between the meshing teeth of mating gears in the train. Specifically, oil from one of the gears which is partially immersed in the oil in the reservoir is carried out of the reservoir on the surfaces of the gear and between its teeth and is transferred through the meshing gear as the gears in the gear train are rotated. The bearing units may be lubricated by the oil which collects on the shaft adjacent to gear and migrates along the surface of the shaft.

Another procedure for the lubrication of bearings which are not in direct contact with each other has been to use a higher speed rotating gear or other part as a slinger for splashing oil around within the housing of the counter unit.

One particularly useful invention for ensuring that lubricant is delivered to remote bearing units is disclosed in U.S. Pat. No. 5,105,911 wherein lubricant transmitting sleeves are disclosed as being loosely mounted on shafts between gears and adjacent bearing units. Oil collected from the juncture of an oil dipped gear and the shaft flows between the sleeve and the shaft to a remote bearing unit.

SUMMARY OF THE INVENTION

The primary aim of the present invention is to provide a simplified arrangement for mounting the rotatable shafts in a counter unit which arrangement is less expensive to manufacture and which also provides for improved lubrication of the bearing portions of the shaft. Specifically, this is accomplished through the provision of support plates for the shaft which are made of a porous metal material having capillary passages therein impregnated with lubricant. Bores through the support plates define bearing walls for shaft support and, in service use are lubricated by the impregnated lubricant.

In another aspect of the invention, support plates are secured within the counter housing with a portion thereof extending into the lubricant reservoir in housing. As a result, lubricant depleted from the bearing walls is replenished by lubricant migrating through the support plates from the reservoir.

The foregoing and other advantages of the present invention will become more apparent from the following description of the preferred embodiment when taken in conjunction with the accompanying drawings.

BEST MODE FOR CARRYING OUT THE INVENTION

Figure 1:
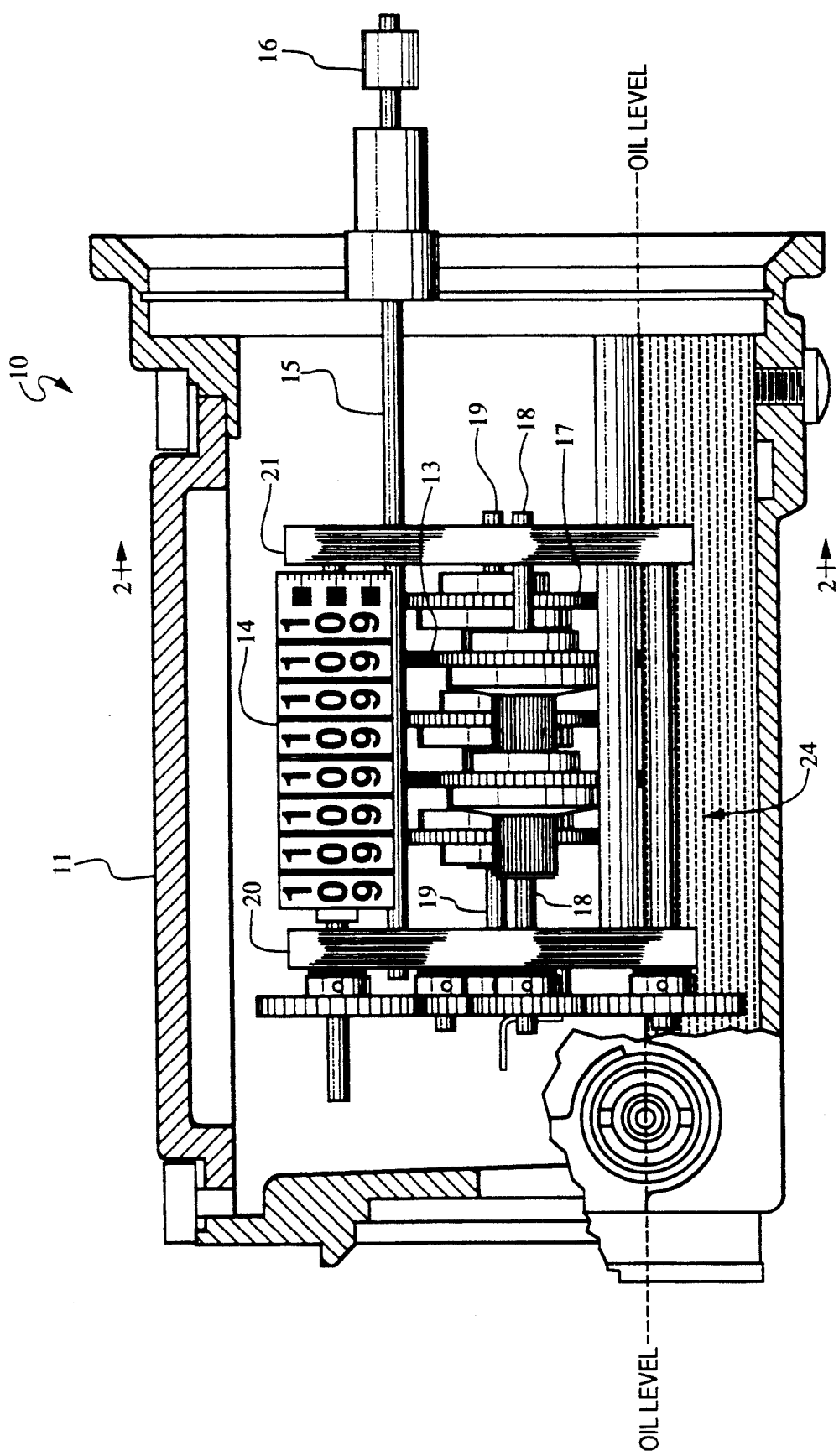
FIG. 1 is an elevational view of a counter unit for a rotary positive displacement gas meter incorporating the novel features of the present invention.
Figure 3:
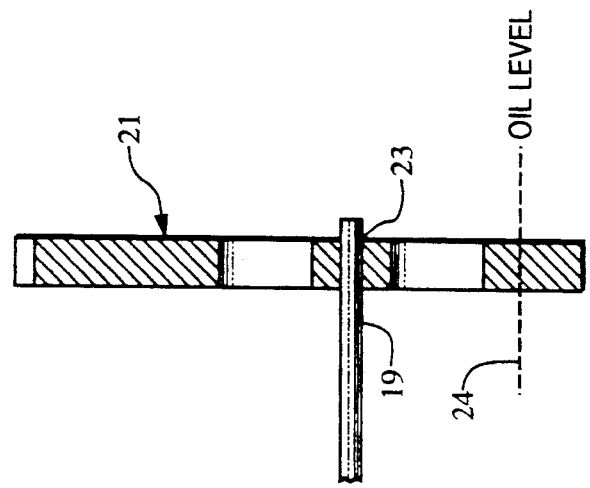
FIG. 3 is a view taken substantially along line 3—3 of FIG. 2.
Figure 2:
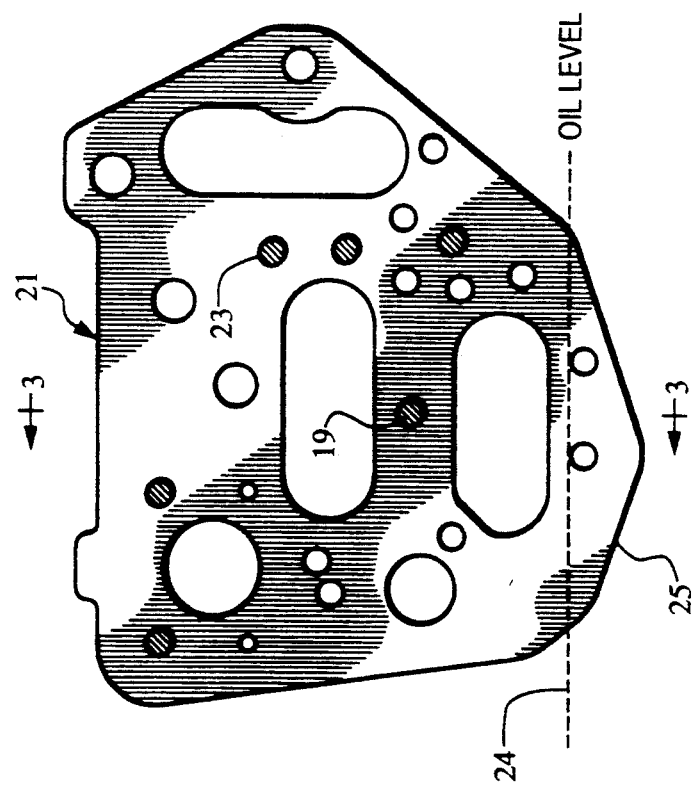
FIG. 2 is an enlarged elevational view taken substantially along line 2—2 of FIG. 1.

As shown in the drawings for purposes of illustration, the present invention is embodied in a counter unit 10 drivingly connected to a rotary positive displacement gas meter (not shown). The counter unit provides an indication of the volume of gas flow through the meter. Within a housing 11 of the counter unit, a gear train 13 connects between a register 14 and a high speed shaft 15 driven by a magnetic coupling 16 to the meter. Multiple gears 17 and rotatable shafts 19 of the gear train are mounted between a rearward support plate 20 and an intermediate support plate 21 connected within the housing. Within the plates, opposite ends of the rotatable shafts are telescoped into bearing openings 23 (see FIG. 2) in each of the plates. For lubrication purposes, one of the gears in the gear train is partially immersed within lubricant contained within a lubricant reservoir 24 located within the bottom portion of the counter housing.

In accordance with the present invention, the support plates 20 and 21 are constructed of a lubricant-impregnated porous metal material enabling a simpler yet better lubricated bearing arrangement to be made for supporting the shafts 19 of the gear train. In constructing the bearings, the openings 23 are formed through the plates with the walls of the openings or bores serving as bearing surfaces for the shafts. This is in contrast to the need for separately mounting bearing sleeves A as is shown in the prior art Fig. In providing lubrication to the bore bearing surfaces, capillary passages within the support plate communicate with the bearing surfaces so that as oil is depleted from the surface of the bearings, it is replenished by oil migrating through the capillary passages.

In the present instance, the material from which each of the plates 20 and 21 is made is a sintered iron powdered-metal material meeting the specifications for a F-0005-20 standard powdered metal as designated by The Metal Powder Industries Federation (MPIF Standard 35; 1987-1988 Edition). Preferably, the material is compressed to a density of 6.4 gm/cc so that the porosity of the resulting powdered metal part includes passages sized for lubricant having a viscosity approximating that of thirty weight oil or less will migrate by capillary action at the rate of at least one-half inch per hour. Preferably, but not necessarily, in the manufacture of the support plates, lubricant is forced into the material by conventional vacuum processes as utilized in powder metal forming industry. This advantageously provides an initial reservoir of lubricant within the support plate material.

In the manufacture of the counter unit, the support plates 20 and 21 including the openings 23 are press formed to precise size and shape within dies (not shown) in a manner well known in the powder metal processing art. Preferably, in assembling the support plates in the counter unit, a lower end portion 25 of each plate is immersed in the lubricant reservoir 24. By virtue of this arrangement, advantage is taken of the capillary passages in the support plates to replenish lubricant lost from the bearing surfaces of the bores. This replacement occurs due to lubricant migrating from the reservoir, through passages by capillary action and to the exposed ends of the capillary passages in bearing surfaces of the bores. Thus, even if the bearing bores are difficult to wet with lubricant from splash lubrication or lubrication migration along rotating shafts, the novel bearing supports ensure adequate lubrication of the rotating shafts and long service life for the meter.

We claim:

1. In a gas meter having a housing containing a lubricant reservoir for lubrication of a gear train in a meter counter assembly, the improvement comprising a support plate mounted within said housing and being of a porous metal material having capillary passages formed therein for transmission of lubricant, said support plate including a portion thereof immersed in said reservoir, a bore spaced from said reservoir extending into said support plate and defining a bearing wall, a shaft in said gear train having a section telescoped into said bore and rotatably supported by said bearing wall, said capillary passages communicating between said reservoir and said bearing wall so that lubricant from said plate lubricates between said shaft and said wall and is replaced by lubricant migrating through said plate from said reservoir.

2. In a gas meter having a housing containing a lubricant reservoir for lubrication of a gear train in a meter counter assembly, the improvement comprising a support plate formed of a lubricant-impregnated powdered metal material and mounted within said housing, said plate having capillary passages integrally formed therewith, a bore defining a bearing wall through said support plate and spaced from said reservoir, a shaft in said gear train having a section telescoped into said bore and rotatably supported by said bearing wall, said capillary passages communicating with said bearing wall for wetting the surface thereof with lubricant from said material to lubricate between said shaft and said wall.

3. In a gas meter having a housing containing a lubricant reservoir for lubrication of a gear train in a meter counter assembly, the improvement comprising a support plate formed of a lubricant-impregnated powdered metal material and mounted within said housing, said plate having capillary passages integrally formed therewith, a first bore defining a first bearing wall through said support plate spaced from said reservoir, a second bore defining a second bearing wall through said support plate spaced from said reservoir, a first shaft in said gear train having a section telescoped into said first bore and rotatably supported by said first bearing wall, a second shaft in said gear train having a portion thereof telescoped into said second bore and rotatably supported by said second bearing wall, said capillary passages communicating with said first and second bearing walls for wetting the surfaces thereof with lubricant from said material to lubricate between said shafts and said walls.

* * * * *